READ/WRITE CIRCUIT FOR USE WITH A MAGNETIC MEMORY

Filed July 28, 1967 4 Sheets-Sheet 1

INVENTOR.
HUBERT C. MARTIN JR.

Feb. 10, 1970 H. C. MARTIN, JR 3,495,223

READ/WRITE CIRCUIT FOR USE WITH A MAGNETIC MEMORY

Filed July 28, 1967 4 Sheets-Sheet 4

United States Patent Office 3,495,223

Patented Feb. 10, 1970

3,495,223

READ/WRITE CIRCUIT FOR USE WITH A MAGNETIC MEMORY

Hubert C. Martin, Jr., Phoenix, Ariz., assignor to General Electric Company, a corporation of New York Filed July 28, 1967, Ser. No. 656,883
Int. Cl. G11b *5/00*
U.S. Cl. 340—174 11 Claims

ABSTRACT OF THE DISCLOSURE

A read/write circuit stores information in a magnetic memory and retrieves information while attenuating noise developed in the circuit.

BACKGROUND OF THE INVENTION

This invention relates to magnetic film memory devices and more particularly to circuits for storing digital information in the magnetic film and for retrieving the stored information from the magnetic film.

Certain magnetic materials may be deposited in a thin film on a sheet of nonmagnetic material. When these magnetic materials are deposited in the presence of a magnetic field, the thin magnetic film exhibits a property of uniaxial anisotropy. Uniaxial anisotropy is understood to mean that tendency of the molecules throughout the film to align themselves along a preferred axis of magnetization. This preferred axis is often referred to as the "easy axis," while the direction of magnetization perpendicular to this axis in the plane of the film is referred to as the transverse or "hard axis" of the film. The uniaxial thin magnetic film exhibits a single easy axis of magnetization defining opposite stable states of remanent flux orientation. In one of these stable states the molecules of the film may be aligned in one direction along the easy axis to represent a binary 1. In the other of these stable states the molecules may be aligned in the opposite direction along the easy axis to represent a binary 0.

A matrix of electrical conductors or sense lines may be positioned adjacent the thin film and electrical currents in these sense lines may be used to rotate the molecules in small selected areas or "memory sites" of the thin film and to store or "write" digital information in these sites. Electrical currents in these sense lines may be used to detect the direction of magnetization of the film in predetermined memory sites and to "read" the digital information stored in these sites.

In order to provide a large amount of storage capacity in a small volume the individual memory sites must be made very small; however, it has been found that the smaller the memory site the smaller the signal which is developed when information is read from the memory sites. When small memory sites are used, noise which is developed when the information is being read may be almost as large as the desired signal. It is desirable, therefore, to provide an improved circuit which will attenuate the noise and amplifiy the desired signal.

It is also desirable that the circuit for amplifying the signal be constructed as a microelectronic circuit by forming the entire circuit on a single "chip" or block composed of semiconductor material. Such microelectronic circuits should be direct-coupled, without coupling capacitors between the various stages as such capacitors are difficult to form on a chip.

It is therefore an object of this invention to provide an improved read/write circuit for use with a thin film memory.

Another object of this invention is to provide an improved read/write circuit which amplifies the signals read by the circuit.

A further object of this invention is to provide an improved read/write circuit which reduces noice developed during the read operation.

Still another object of this invention is to provide an improved read/write circuit which utilizes small values of input signals.

A still further object of this invention is to provide an improved direct-coupled amplifier circuit for use with a thin film memory.

SUMMARY OF THE INVENTION

The foregoing objects are achieved in a bridge amplifier circuit employing four transistors. The bridge amplifier circuit has four signal-input terminals, with each of the input terminals being coupled to the base of a corresponding one of the transistors. Two of the signal-output terminals are connected to a first pair of sense lines so that noise which is developed on these lines is cancelled in the bridge amplifier. Signals which are picked up by these sense lines are amplified by the bridge amplifier. The other two signal-input terminals are connected to a second pair of sense lines. The signals which are amplified by the bridge amplifier are direct-coupled to a differential amplifier which further attenuates the noise and further amplifies the desired signals.

Other objects of this invention will become apparent from the following description when taken in connection with the accompanying drawings.

DESCRIPTION OF THE PREFERRED EMBODIMENT

Figure 1:
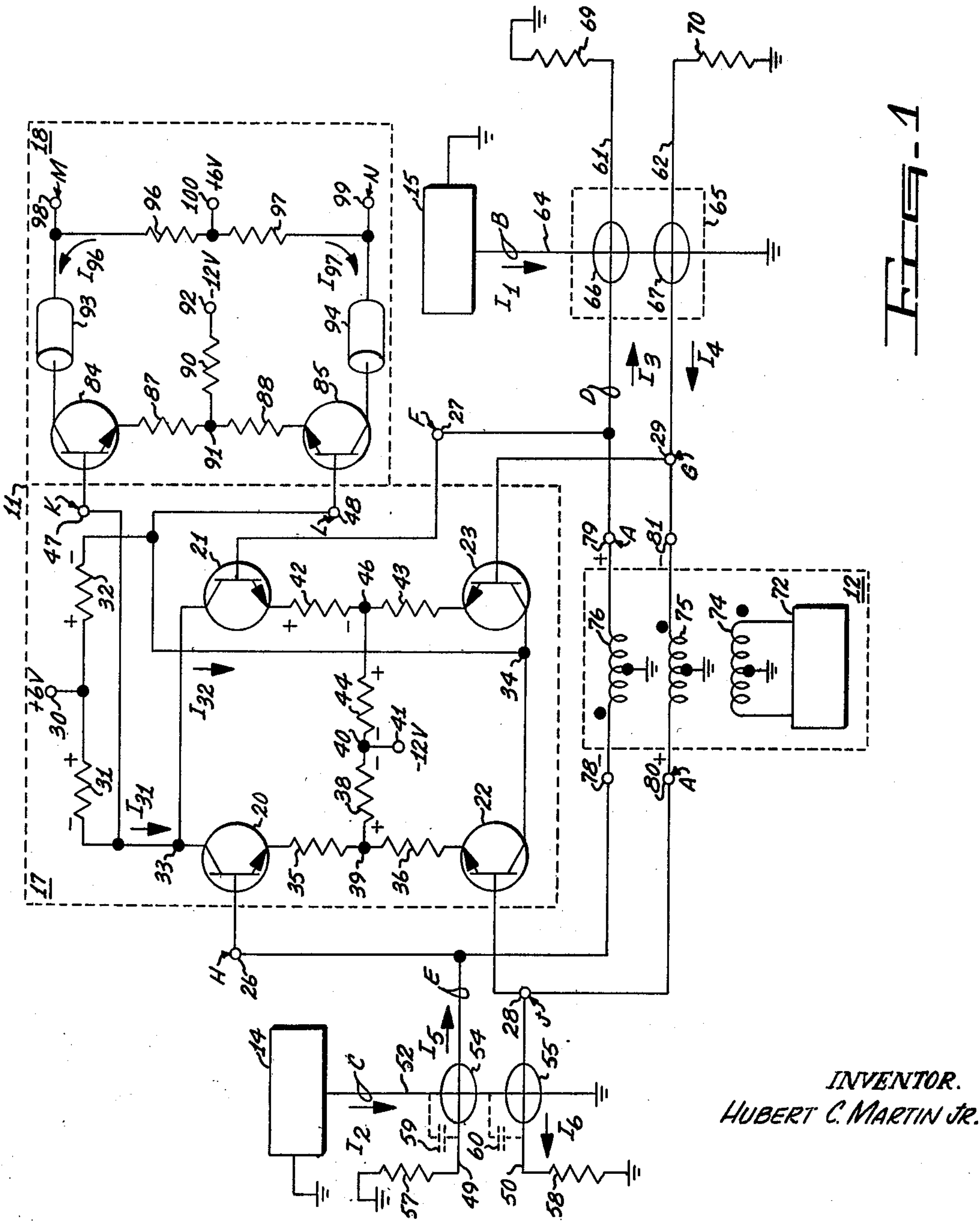
FIG. 1 is a circuit diagram of one embodiment of the instant invention.

The system for storing and retrieving information as shown in FIG. 1 includes a balanced amplifier 11, a generator or digit driver 12, and first and second sources of current or word drivers 14 and 15. In the illustrated embodiment the balanced amplifier 11 includes a first stage or bridge amplifier 17 and a second stage or differential amplifier 18. The bridge amplifier 17 includes transistors 20–23 each having a base, an emitter and a collector. The bases of transistors 20, 21, 22 and 23 are connected to signal-input terminals 26, 27, 28 and 29 respectively. The collectors of transistors 20 and 21 are connected through a first load impedance or resistive means 31 to a terminal 30 which is connected to a suitable reference potential, such as a +6 volts and the collectors of transistors 22 and 23 are connected through a second load impedance or resistive means 32 to terminal 30.

Resistors 35 and 36 are serially connected between the emitters of transistors 20 and 22. A resistor 38 is connected between a junction point 39 between resistors 35 and 36 and a terminal 41 which is connected to a suitable source of negative potential, such as —12 volts. Resistor 38 provides a feedback voltage to the emitters of transistors 20 and 22 so that noise which is coupled to the bases of transistors 20 and 22 will be attenuated. Resistors 42 and 43 are serially connected between the emitters of transistors 21 and 23. A resistor 44 connected between terminal 41 and a junction point 46 between resistors 42 and 43 provides a feedback voltage to the emitters of transistors 21 and 23 so that noise which is coupled to the bases of transistors 21 and 23 will be attenuated.

First and second sense or digit lines 49 and 50 connected to signal-input terminals 26 and 28 respectively provide input signals to the bridge amplifier 17. A first conductor or word line 52 is connected to the first word source 14 which provides a current for writing digital information into a pair of thin film memory sites 54 and 55 and for reading information from these sites. Word line 52 is mounted transversally to the digit lines 49 and 50 in a plane parallel to the plane of the thin film memory sites 54 and 55. A pair of resistors 57 and 58 are serially connected between digit lines 49 and 50.

A second pair of sense or digit lines 61 and 62 connected to signal-input terminals 27 and 29 respectively provide input signals to the bridge amplifier 17. A second conductor or word line 64 is connected to the second word driver 15 which provides current for writing information into thin film sites 66 and 67 and for reading information from these sites. A pair of resistors 69 and 70 are serially connected between word lines 61 and 62.

Each pair of digit lines has a fixed characteristic impedance which is determined by the physical dimensions of the lines. Each of the resistors which are connected between one end of each of the digit lines and ground is selected to match the characteristic impedance of the lines. The resistors which are connected to the emitters of the transistors 20–23 are selected so that the impedance at the base of each of these transistors is several times as large as the characteristic impedance of the lines. This high impedance is connected to the other end of each of the digit lines so as to cause reflections of pulses on the digit lines and thereby intentionally cause wave distortions.

Digit driver 12 includes a signal source 72 and a transformer having a primary winding 74 and first and secondary windings 75 and 76. Secondary winding 75 is connected between output terminals 78 and 79, and secondary winding 76 is connected between output terminals 80 and 81. Dots are shown at the ends of windings 74, 75 and 76 of the transformer to represent the phase of the voltage induced in one winding with respect to the other winding. It will be noted that, if the voltage rises in the primary winding 74 of the transformer at the dot end thereof, the voltages in the transformers secondary windings 75 and 76 will also rise at the dot end. Digit driver 12 provides current for writing information into the memory sites.

The second stage of the amplifier 18 includes a pair of transistors 84 and 85 each having a base, a collector and emitter. A pair of resistors 87 and 88 are serially connected between the emitters of the transistors 84 and 85. A resistor 90 is connected between a junction point 91 between resistors 87 and 88 and a terminal 92 which is connected to a suitable reference potential, such as a —12 volts. Resistor 90 provides a feedback voltage to the emitters of transistors 84 and 85 so that noise which is coupled to the bases of transistors 84 and 85 will be attenuated. The collectors of transistors 84 and 85 are coupled to load circuits such as coaxial cables 93 and 94. As shown in FIG. 1, the coaxial cables 93 and 94 are arranged in series with resistors 96 and 97 and a suitable reference potential, such as +6 volts.

When it is desired to read the information stored in a predetermined memory site, a pulse of current is applied to the word line which is mounted adjacent the memory site. When it is desired to write information into a predetermined memory site, a pulse of current is applied to the word line which is mounted adjacent the memory site and another pulse of current is applied to the digit line which is also mounted adjacent the memory site.

Figure 3:
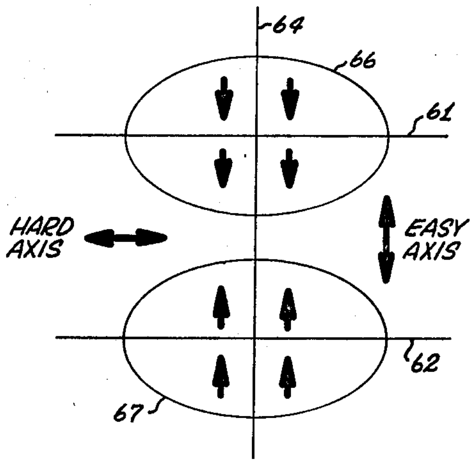
FIGS. 3–7 are enlarged views of a portion of the invention shown in FIG. 1, and illustrate the operation of the present invention.
Figure 4:
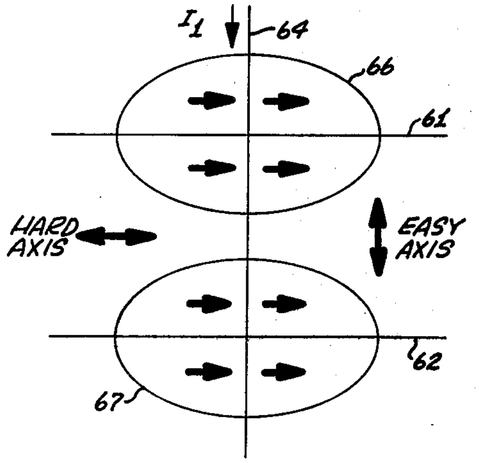

The operating of the system for storing and retrieving information in thin magnetic film shown in FIG. 1 will now be described in connection with the waveforms shown in FIG. 8, and with the memory sites shown in FIGS. 3–7. A small section of the thin film memory 65 in FIG. 1 has been enlarged in FIGS. 3–7 to more clearly show the operation of the circuit. When there is no electrical current in any of the lines adjacent the memory sites, the molecules in the memory sites are aligned parallel to the easy axis shown in FIGS. 3–7. These molecules may be aligned in either an upward direction parallel to the easy axis or in a downward direction parallel to the easy axis. FIG. 3 illustrates the alignment of the molecules when a binary 0 is stored in memory sites 66 and 67. The molecules in the film of memory site 66 are aligned in a downward direction parallel to the easy axis while the molecules in memory site 67 are aligned in an upward direction parallel to the easy axis. At this time there is no current in word line 64 or in digit lines 61 and 62.

Figure 5:
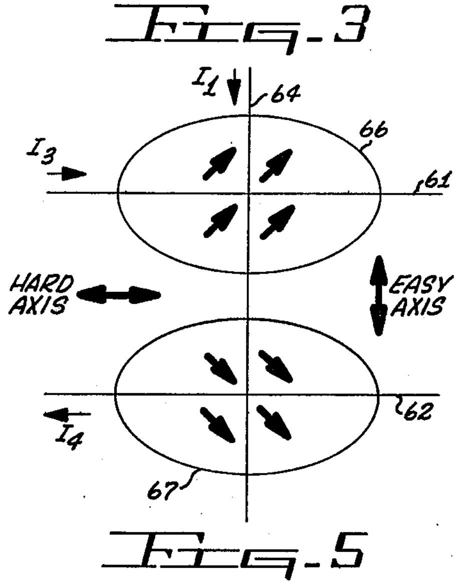
Figure 6:
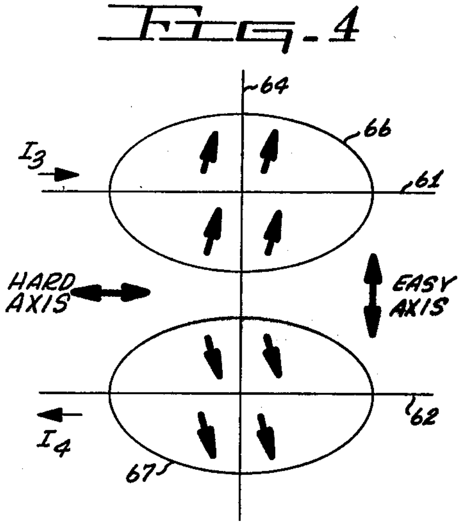

FIGS. 3, 4, 5 and 6 show a series of steps used to change the information in memory sites from a binary 0 shown in FIG. 3 to a binary 1 shown in FIG. 6. In the first step, the molecules in memory sites 66 and 67 are rotated into the horizontal position shown in FIG. 4 by a current $I_1$ which is applied to word line 64. Current $I_1$ produces a magnetic field around word line 64 which causes the molecules in memory sites 66 and 67 to be aligned in a horizontal direction.

In the second step, currents $I_3$ and $I_4$ are applied to digit lines 61 and 62 at the same time that current $I_1$ flows in the word line 64. Currents $I_3$ and $I_4$ produce magnetic fields around word lines 61 and 62. The field around digit line 61 combined with the field around word line 64 cause the molecules in memory site 66 to align in a slightly upward direction as shown in FIG. 5. The field around digit line 62 combined with the field around word line 64 cause the molecules in memory site 67 to align in a slightly downward direction.

In the third step, currents $I_3$ and $I_4$ are still applied to digit lines 61 and 62 when the current $I_1$ is no longer flowing in word line 64. The magnetic field around digit line 61 causes the molecules in memory sites 66 to align in an upward direction while the magnetic field around digit line 62 causes the molecules in memory site 67 to align in a downward direction. When the currents $I_3$ and $I_4$ are not applied to digit lines 61 and 62 the molecules remain aligned with the easy axis as shown in FIG. 6. Thus, it is seen that a combination of current $I_1$ in word line 64 and currents $I_3$ and $I_4$ in the digit lines 61 and 62 rotate the molecules in memory sites 66 and 67 from the positions shown in FIG. 3 to the position shown in FIG. 6.

Figure 7:
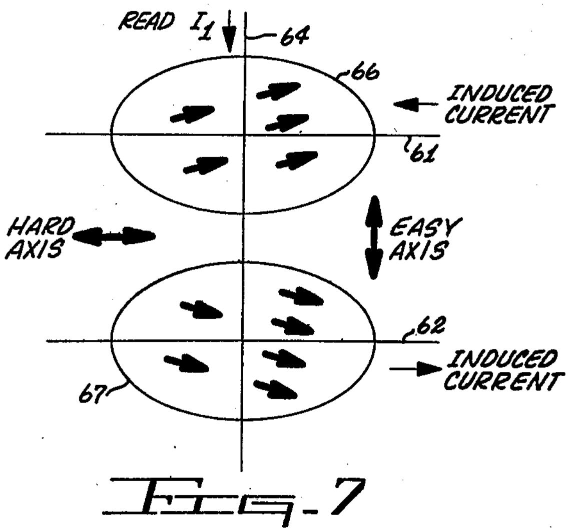

When it is desired to read the information stored in memory sites 66 and 67, current $I_1$ is applied to word line 64. Current $I_1$ provides a magnetic field which causes the molecules to rotate from the vertical alignment shown in FIG. 6 to the horizontal alignment shown in FIG. 7. The clockwise rotation of the molecules in memory site 66 causes an induced pulse of current to flow from right to left in digit line 61 as shown in FIG. 7. The counterclockwise rotation of the molecules in memory site 67 causes a pulse of induced current to flow from left to right in digit line 62 as shown. Thus current $I_1$ can be used to induce pulses of current in digit lines 61 and 62 which indicate the direction of the rotaiton of the molecules in the memory sites and indicates the type of binary information which has been stored in memory sites 66 and 67.

When it is desired to read the information stored in memory sites 54 and 55, a current $I_2$ is applied to word line 52. Current $I_2$ causes an induced pulse of current to flow in digit lines 49 and 50 as described above. The balanced amplifier 11 cannot read information from memory sites 54 and 55 at the same time that it reads information from memory sites 66 and 67.

The pulses of induced current in the digit lines provide pulses of voltage which travel along these digit lines.

Since digit lines 61 and 62 are terminated by the mismatching impedance at signal-input terminals 27 and 29, the pulses of voltage transmitted along digit lines 61 and 62 will be distorted. The distorted wave representing the transmitted signal voltage wave at the end of the digit lines 61 and 62 adjacent the signal-input terminals 27 and 29 may be expressed as the sum of the incident and reflected waves. The incident wave is that wave traveling from the signal generating means or lines 61 and 62 toward the mismatch at the input terminals 27 and 29, and the reflected wave is a wave traveling from the mismatch at the terminals back toward the resistors 69 and 70 and is generated at the mismatching means as a result of the incident wave. The actual voltage existing on digit lines 61 and 62 is the sum of the voltages and the incident reflected waves. Thus, the use of a line terminated in an impedance higher than the impedance of the digit line results in a distorted voltage wave at the end of the digit line having a voltage amplitude higher than the signal introduced into the circuitry by the currents induced in digit lines 61 and 62.

When the load impedance is infinite, such as with an open circuit at the end of lines 61 and 62, the incident and reflected waves will have equal magnitudes at the load and the reflection will be such that the voltage of the incident and reflected waves will have the same phase. As a result, the voltages of the two waves add arithmetically and the resulting voltage at the input terminals 27 and 29 wil be twice the incidence wave voltage. As the distance from the load end of the digit line increases, the incident wave advances in phase while the reflected wave lags accordingly. The vector sum of the voltage of the two waves is then less than the arithmetic sum.

A more detailed explanation and suitable equation describing the reflective voltage wave characteristics of a mismatch between a load and a pair of lines used to transmit signals are described in the fourth edition, chapter 4, and particularly pages 82–95 of Electrical and Electronic Engineering by Frederick E. Terman, published by McGraw-Hill Book Company, Inc. in 1955.

The balanced amplifier 11 of FIG. 1 amplifies the voltages which are developed by the induced currents in digit lines 61 and 62 and produces an output signal which indicates the type of information which has been stored in the memory sites. The balanced amplifier 11 attenuates signals from the digit driver 12 and other undesired signals or noise so that these undesired signals do not appear at the signal-output terminals 47 and 48.

The operation of the balanced amplifier will now be discussed in connection with the waveforms shown in FIG. 8. When there is no signal at the input terminals 26–29 of amplifier 11, each of the transistors 20–23 conducts substantially the same amount of current. A current $I_{31}$ flows from terminal 30 through load resistor 31 to junction point 33 where it divides. A portion of this current $I_{31}$ flows from collector to emitter of transistor 20, through resistor 35, resistors 38 to terminal 41. A current $I_{32}$ flows from terminal 30 through resistor 32 to junction point 34 where it divides. A portion of current $I_{32}$ flows from collector to emitter of transistor 23 through resistors 43 and 44 to terminal 41. Another portion of current $I_{32}$ flows from junction point 34 through collector to emitter of transistor 22, through resistors 36 and 38 to terminal 41. Currents $I_{31}$ and $I_{32}$ produce the voltage drops shown across resistors 31 and 32 respectively. When the value of current $I_{31}$ is equal to the value of current $I_{32}$, the voltage drop across resistor 31 is equal to the voltage drop across resistor 32 so that the voltage at signal-output terminal 47 is equal to the voltage at signal-output terminal 48.

When pulses of currents are induced in the digit lines 49 and 50 or in digit lines 61 and 62, currents $I_{31}$ and $I_{32}$ change so that the voltage at signal-output terminal 47 is not equal to the voltage at signal-output terminal 48. For example, when induced currents $I_3$ and $I_4$ flow in digit lines 61 and 62 as shown in FIG. 1, induced current $I_4$ causes an increase in current between base and emitter of transistor 23. The increase in current between base and emitter of transistor 23 causes an increase in current $I_{32}$ through transistor 23. The induced current $I_3$ causes a decrease in current flowing from base to emitter of transistor 21. The decrease in current between base and emitter of transistor 21 causes a decrease in current $I_{31}$ through transistor 21. The increase in current $I_{32}$ causes an increase in voltage drop across resistor 32 so that the voltage at signal-output terminal 48 decreases. The decrease in current $I_{31}$ causes a decrease in voltage drop across resistor 31 so that the voltage at signal-output terminal 47 increases. The increase in the value of the current $I_{32}$ is substantially equal to the increase in the value of the current $I_{31}$ so that current through resistor 44 is substantially the same as the current through resistor 44 when there were no induced currents in the digit lines. Similarly, induced currents $I_5$ and $I_6$ in digit lines 49 and 50 cause an increase in the voltage at signal-output terminal 48 and a decrease in the voltage at signal-output terminal 47.

When the voltages from terminals 78–81 of digit driver 12 are applied to signal input terminals 26–29 of the balanced amplifier 11, there is no appreciable change in current through either resistor 31 or resistor 32. For example, when the positive voltage shown in FIG. 1 is applied to the base of transistor 21 current through collector to emitter of transistor 21 increases. The negative voltage applied to the base of transistor 20 causes a corresponding decrease in current through collector to emitter of transistor 20. The current $I_{31}$ through transistors 20 and 21 and through resistor 31 remains substantially constant so that the voltage at signal-output terminal 47 remains substantially constant. At this same time the positive voltage applied to the base of transistor 22 causes an increase in current through collector to emitter of transistor 22 and the negative voltage applied to the base of transistor 23 causes a corresponding decrease in current through collector to emitter of transistor 23. The current $I_{32}$ through transistors 22 and 23 and through resistor 32 remains substantially constant so that the voltage at signal-output terminal 48 remains substantially constant.

The resistors between terminal 41 and the emitters of the transistors 20–23 prevent the transistors in the bridge amplifier 17 from saturating. These resistors provide a feedback voltage so that the voltage at the emitter of a transistor changes when the voltage at the base of the transistor changes. For example, when a relatively large value of voltage of the polarity shown in FIG. 1 is produced by digit driver 12 at terminals 78–82, the negative voltage applied to the base of transistor 23 renders transistor 23 nonconductive. The positive voltage applied to the base of transistor 21 causes an increase in current through transistor 21 and through resistors 42 and 44. This increase in current causes an increase in voltage drop across resistors 42 and 44 so that the voltage at the emitter of transistor 21 increases and prevents saturation of transistor 21. At this same time the negative voltage applied to the base of transistor 20 renders transistor 20 nonconductive. The positive voltage applied to the base of transistor 22 causes an increase in current through transistor 22 and through resistors 36 and 38. This increase in current causes an increase in voltage drop across resistors 36 and 38 and prevents saturation of transistor 22. The increase in currents through transistors 21 and 22 cause an incease in voltage drop across resistors 31 and 32 respectively and causes a decrease in voltage at signal-output terminals 47 and 48. The decrease in voltage at terminal 47 is substantially equal to the decrease in voltage at terminal 48.

Due to the physical arrangement of the word lines and the digit lines in the circuit of FIG. 1, a distributed capacitance exists between the word lines and the adjacent digit lines. Distributed capacitance between these lines is represented by the dashed lines and the dashed configuration of capacitors 59 and 60. This capacitance provides the coupling of an undesired signal or noise from the word line 52 to the digit lines 49 and 50. Other distributed capacitance (not shown) exists between word line 64 and digit lines 61 and 62. Each time that a pulse of current flows in a word line a pulse of noise voltage is coupled through the distributed capacitance to a pair of adjacent digit lines.

Noise which is introduced into the digit lines due to current in the word lines is cancelled by the balanced amplifier 11. For example, when current $I_2$ flows through word line 52, a positive voltage may be coupled through capacitances 59 and 60 to digit lines 49 and 50 and applied to signal-input terminals 26 and 28. This positive voltage at signal-input terminals 26 and 28 causes an increase in currents $I_{31}$ and $I_{32}$ through transistors 20 and 22 respectively and through resistor 38. The increase in current through resistor 38 produces an increase in the voltage drop across resistor 38 so that the voltage at the emitters of transistors 20 and 22 increases. This increase in voltage at the emitters of transistors 20 and 22 produces a degenerative feedback voltage between the base and the emitter of transistors 20 and 22 so that the actual increases in currents $I_{31}$ and $I_{32}$ are very small. When the value of capacitance 59 is substantially equal to the value of capacitance 60 the voltage coupled to the base of transistor 20 is substantially equal to the voltage coupled to the base of transistor 22. This causes the current through resistor 31 and through collector to emitter of transistor 20 to be substantially equal to the current through resistor 32 and through collector to emitter of transistor 22. The voltage drop across resistor 31 is substantially equal to the voltage drop across resistor 32 and the voltage at signal-output terminal 47 is equal to the voltage at signal-output terminal 48. Thus, the noise voltage coupled to the signal-input terminals of amplifier 17 does not produce any difference in voltage between signal-output terminals 47 and 48.

The signals at signal-output terminals 47 and 48 of amplifier 17 are further amplified and the noise is further attenuated by the differential amplifier 18. When there are no signals applied to the signal-input terminals 26–29 of amplifier 17, the transistors 84 and 85 of amplifier 18 are arranged to be in a conductive condition by the voltages at terminals 47 and 48. A current $I_{96}$ flows from terminal 100 through resistor 96, coaxial cable 93, from collector to emitter of transistor 84, through resistors 87 and 90 to terminal 92. A current $I_{97}$ flows from terminal 100 through resistor 97, coaxial cable 94, from collector to emitter of transistor 85, through resistors 88 and 90 to terminal 92. When there are no signals applied to the signal-input terminals 26–29 of amplifier 17, the value of the voltage at terminal 47 is substantially equal to the value of the voltage at terminal 48 as explained above. This causes the value of current $I_{96}$ to be substantially equal to the value of current $I_{97}$ so that the voltage drop across resistor 96 is substantially equal to the voltage drop across resistor 97 and the value of the voltage at output terminal 98 is substantially equal to the value of voltage at output terminal 99.

When a signal is applied to the signal-input terminals 26 and 28 or to signal-input terminals 27 and 29, the voltages at terminals 47 and 48 change as explained above. The change in voltage at terminals 47 and 48 causes a change in voltage at output terminals 98 and 99. For example, when signals at signal-input terminals 27 and 29 cause an increase in the value of voltage at terminal 47 and a decrease in the value of voltage at terminal 48, the current $I_{96}$ through transistor 84 increases. This increase in current $I_{96}$ causes an increase in the voltage drop across resistor 96 and a decrease in the voltage at output terminal 98. The decrease in the value of voltage at terminal 48 causes a decrease in current $I_{97}$ through transistor 85 which causes a decrease in the voltage drop across resistor 97 and an increase in the voltage at output terminal 99 so that the value of the voltage at terminal 99 is larger than the value of the voltage at terminal 98.

The differential amplifier 18 attenuates noise which may be applied to terminals 47 and 48. For example, when noise causes an increase in the value of voltage at both terminals 47 and 48 there is a slight increase in current between base and emitter of transistors 84 and 85. This increase in current between base and emitter causes a slight increase in currents $I_{96}$ and $I_{97}$ between collector and emitter of transistors 84 and 85 respectively and an increase in current through resistor 90. This causes an increase in the voltage drop across resistor 90 which causes an increase in the value of voltage at the emitters of transistors 84 and 85. The increase in voltage at the emitter of transistors 84 and 85 is almost the same as the increase in voltage at terminals 47 and 48 so that currents $I_{96}$ and $I_{97}$ increase a very small amount. The small change in currents $I_{96}$ and $I_{97}$ cause a very small change in the voltage drops across load resistors 96 and 97 respectively. Thus, the change in voltage drops across load resistors 96 and 97 is less than the change in voltage at terminals 47 and 48 so that the noise is attenuated.

Figure 2:
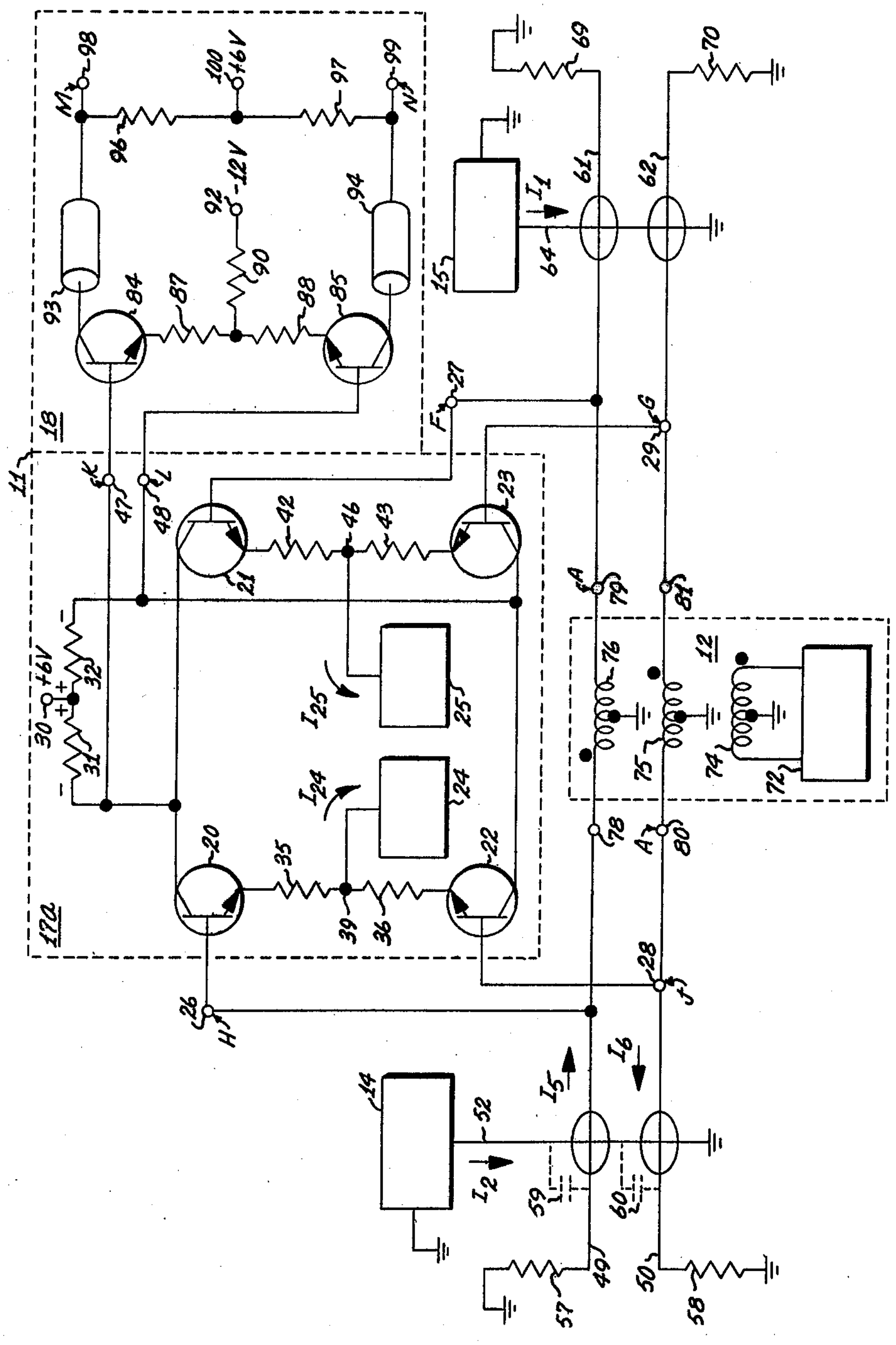
FIG. 2 is a circuit diagram of another embodiment of the instant invention.

FIG. 2 illustrates another embodiment of the circuit shown in FIG. 1 wherein the resistors 38 and 44 in amplifier 17 of FIG. 1 have been replaced by a pair of constant-current sources 24 and 25 in amplifier **17*a*. These constant-current sources provide an increase in degeneration in the amplifier 17*a* so that noise applied to terminals 26–29 is attenuated even more than the amplifier in FIG. 1. For example, when a positive noise voltage is coupled through distributed capacitances 59 and 60 to terminals 26 and 28, this positive voltage is applied to the bases of transistors 20 and 22. A positive voltage at the bases of transistors 20 and 22 tends to increase the current from collector to emitter in each of these transistors; however, the currents through transistors 20 and 22 flow to constant-current source 24. The current to this source 24 can not change so that the currents through transistors 20 and 22 cannot increase and the currents through resistors 31 and 32 do not change. The voltage drops across resistors 31 and 32 remain constant and the voltage at signal-output terminals 47 and 48** remain constant.

Signal currents in digit lines 49 and 50 are amplified by amplifier **17*a* in the same manner as in amplifier 17 of FIG. 1. For example, when induced currents $I_5$ and $I_6$ flow as shown in digit lines 49 and 50, the current through transistor 20 increases and the current through transistor 22 decreases a corresponding amount. The total current to source 24 remains constant. The increase in current through transistor 20 causes an increase in current through resistor 31 so that the voltage drop across resistor 31 increases and the voltage at signal-output terminal 47 decreases. The decrease in current through transistor 22 causes a decrease in current through resistor 32 so that the voltage drop across resistor 32 decreases and the voltage at signal-output terminal 48** increases.

Figure 8:
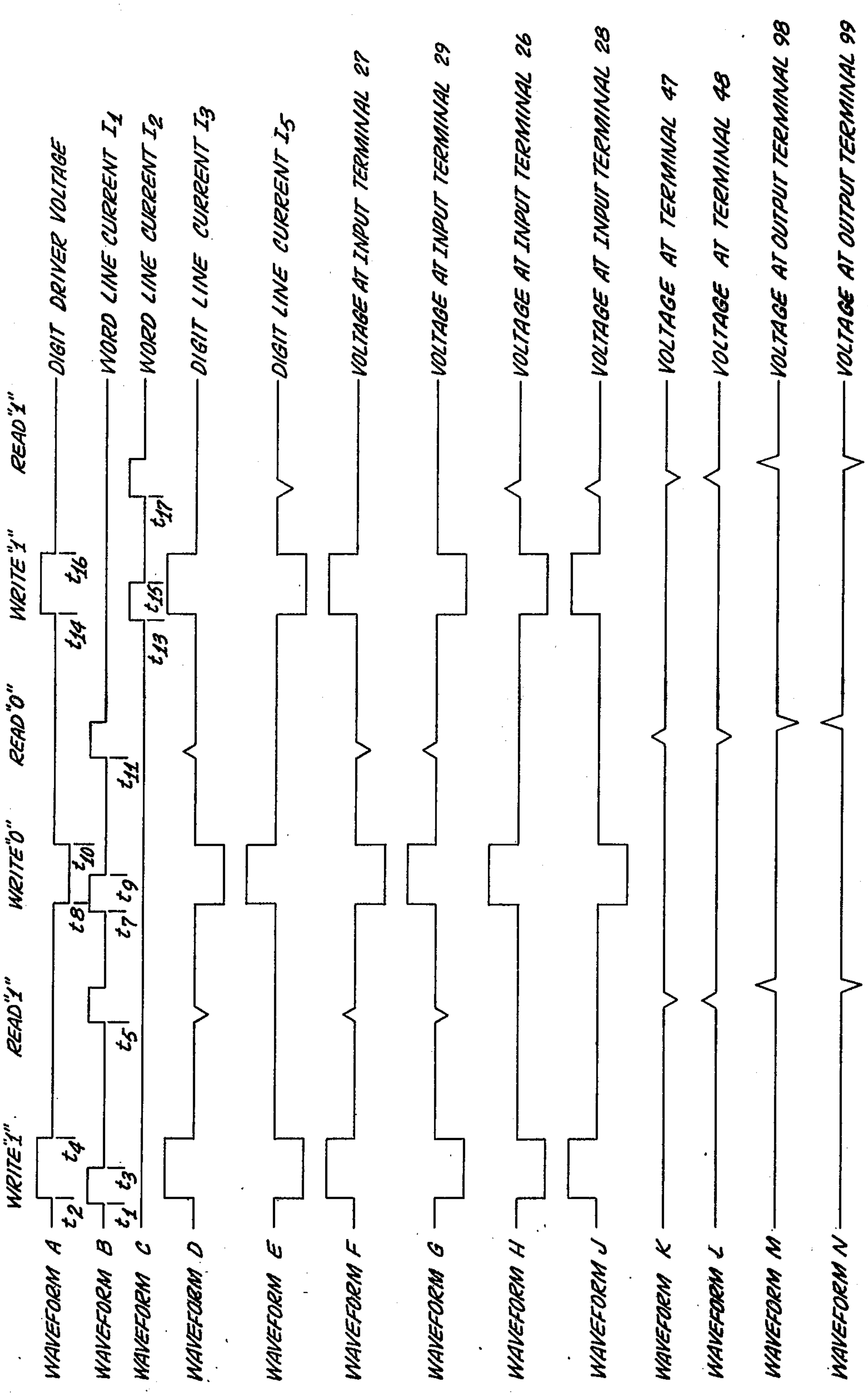
FIG. 8 illustrates waveforms which are useful in explaining the operation of the invention in FIGS. 1 and 2.

The operation of the balanced amplifier and the writing into and reading information from the memory sites may be more clearly seen by reference to the timing chart shown in FIG. 8.

Waveform A illustrates diagramatically the voltage at the output terminals 79 and 80 of the digit driver 12.

Waveforms B and C illustrate the word lines currents $I_1$ and $I_2$ provided by word drivers 15 and 14 respectively.

Waveforms D and E illustrate the digit line currents $I_3$ and $I_5$ in digit lines 61 and 49 respectively.

Waveforms F, G, H and J illustrate graphically the signal voltages at signal-input terminals 27, 29, 26 and 28 respectively.

Waveforms K and L illustrate the voltage at signal-output terminals 47 and 48 respectively of the bridge amplifier 17.

Waveforms M and N illustrate the voltage at output terminals 98 and 99 respectively of the differential amplifier 18.

I claim:

1. A balanced direct-coupled amplifier comprising: first, second, third and fourth transistors each having a collector, a base and an emitter; first and second reference potentials; first resistive means for connecting said collectors of said first and second transistors to said first potential; second resistive means for connecting said collector of said third and fourth transistors to said first potential; first, second, third, fourth, fifth and sixth resistors, said first and second resistors being serially connected between said emitters of said first and said third transistors, said third and fourth resistors being serially connected between said emitters of said second and said fourth transistors, said fifth resistor being connected between said second potential and a junction between said first and said second resistors, said sixth resistor being connected between said second potential and a junction between said third and said fourth resistors; first, second, third and fourth signal-input terminals; and means for coupling each of said terminals to the base of a corresponding one of said transistors.

2. A balanced direct-coupled amplifier as defined in claim 1 including: fifth and sixth transistors each having a collector, a base and an emitter, said base of said fifth transistor being connected to said collector of said first transistor, said base of said sixth transistor being connected to said collector of said third transistor; seventh, eighth and ninth resistors, said seventh and eighth resistors being serially connected between said emitters of said fifth and sixth transistors, said ninth resistor being connected between said second potential and a junction between said seventh and eighth resistors; and a first load impedance, said first impedance being connected between said first potential and said collector of said fifth transistor, said collector of said sixth transistor being coupled to said first potential.

3. A balanced direct-coupled amplifier as defined in claim 1 including: fifth and sixth transistors each having a collector, a base and an emitter, said base of said fifth transistor being connected to said collector of said first transistor, said base of said sixth transistor being connected to said collector of said third transistor; seventh, eighth and ninth resistors, said seventh and eighth resistors being serially connected between said emitters of said fifth and sixth transistors, said ninth resistor being connected between said second potential and a junction between said seventh and eighth resistors; and first and second load impedances, said first empedance being connected between said first potential and said collector of said fifth transistor, said second impedance being connected between said first potential and said collector of said sixth transistor.

4. A balanced direct-coupled amplifier comprising: first, second, third and fourth transistors each having a collector, a base and an emitter; a first reference potential; first resistive means for connecting said collectors of said first and second transistors to said first potential; second resistive means for connecting said collectors of said third and fourth transistors to said first potential; first, second, third and fourth resistors; first and second constant-current sources, said first resistor being connected between said first constant-current source and said emitter of said first transistor, said second resistor being connected between said first constant-current source and said emitter of said third transistor, said third resistor being connected between said second constant-current source and said emitter of said second transistor, said fourth resistor being connected between said second constant-current source and said emitter of said fourth transistor; first, second, third and fourth signal-input terminals; and means for coupling each of said terminals to the base of a corresponding one of said transistors.

5. A balanced direct-coupled amplifier as defined in claim 4 including: fifth and sixth transistors each having a collector, a base and an emitter, said base of said fifth transistor being connected to said collector of said first transistor, said base of said sixth transistor being connected to said collector of said third transistor; a second reference potential; seventh, eighth and ninth resistors, said seventh and eighth resistors being serially connected between said emitters of said fifth and sixth transistors, said ninth resistor being connected between said second potential and a junction between said seventh and eighth resistors; and a first load impedance, said first impedance being connected between said first potential and said collector of said fifth transistor, said collector of said sixth transistor being coupled to said first potential.

6. In a system for storing and retrieving information in a magnetic film, the combination comprising: a balanced direct-coupled amplifier as defined in claim 4; a first pair of sense lines, said sense lines, being mounted adjacent said film in a plane parallel to the plane of said film; means for serially connecting said sense lines between said second and said fourth signal-input terminals of said amplifier; a conductor, said conductor being mounted adjacent said film in a plane parallel to the plane of said film, said conductor being mounted transversally to said sense lines; a source of current, said source of current being connected to said conductor; a signal generator having a first and a second pair of output terminals; means for coupling said first pair of output terminals to said first and second signal-input terminals of said amplifier; and means for coupling said second pair of output terminals to said third and fourth signal-input terminals of said amplifier.

7. In a system for storing and retrieving information in a magnetic film, the combination comprising: a balanced direct-coupled amplifier as defined in claim 4; a first pair of sense lines, said sense lines being mounted adjacent said film in a plane parallel to the plane of said film; means for serially connecting said sense lines between said second and said fourth signal-input terminals of said amplifier; a conductor, said conductor being mounted adjacent said film in a plane parallel to the plane of said film, said conductor being mounted transversally to said sense lines; a source of current, said source being connected to said conductor; a signal generator having a first and a second pair of output terminals, said generator providing signals to said first and said second pair of output terminals, the signal to said first pair of output terminals being in phase with the signal to said second pair of output terminals; means for coupling said first pair of output terminals to said first and second signal-input terminals of said amplifier; and means for coupling said second pair of output terminals to said third and fourth signal-input terminals of said amplifier.

8. In a system for storing and retrieving information in a magnetic film, the combination comprising: a balanced amplifier including first, second, third and fourth transistors each having a collector, a base and an emitter, first and second reference potentials, first resistive means for connecting said collectors of said first and second transistors to said first potential, second resistive means for connecting said collector of said third and fourth transistors to said first potential, first, second, third, fourth, fifth and sixth resistors, said first and second resistors being serially connected between said emitters of said first and said third transistors, said third and fourth resistors being serially connected between said emitters of said second and said fourth transistors, said fifth resistor being connected between said second potential and a junction between said first and said second resistors, said sixth resistor being connected between said second potential and a junction between said third and said fourth resistors, first, second, third and fourth signal-input terminals, means for coupling each of said signal-input terminals to the base of a corresponding one of said transistors; a first pair of sense lines, said sense lines being mounted adjacent said film in a plane parallel to the plane of said film; means for serially connecting said sense lines between said second and said fourth signal-input terminals; a first conductor, said first conductor being mounted adjacent said film in a plane parallel to the plane of said film, said first conductor being mounted transversally to said sense lines; a first source of current, said first source being connected to said first conductor; a signal generator having a first and a second pair of output perminals, said generator providing signals to said first and said second pair of output terminals; means for coupling said first pair of output terminals to said first and second signal-input terminals of said amplifier; and means for coupling said second pair of output terminals to said third and fourth signal-input terminals of said amplifier.

9. In a system for storing and retrieving information in a magnetic film, the combination as defined in claim 8 wherein: the signal to said first pair of output terminals of said generator is in phase with the signal to said second pair of output terminals of said generator.

10. In a system for storing and retrieving information in a magnetic film, the combination as defined in claim 8 including: a second pair of sense lines, said second pair of sense lines being mounted adjacent said film in a plane parallel to the plane of said film; means for serially connecting said second pair of sense lines between said first and said third signal-input terminals; a second conductor, said second conductor being mounted adjacent said film in a plane parallel to the plane of said film, said second conductor being mounted transversally to said second pair of sense lines; and a second source of current, said second source being connected to said second conductor.

11. In a system for storing and retrieving information in a magnetic film, the combinatioin as defined in claim 8 including: impedance mismatching means for terminating said sense lines at said second and said fourth signal-input terminals.

References Cited

UNITED STATES PATENTS

| | | | |
|---|---|---|---|
| 3,157,839 | 11/1964 | Brown et al. ------ | 330—124 X |
| 3,195,114 | 7/1965 | Gunderson et al. ---- | 340—174 |
| 3,330,970 | 7/1967 | Wennerberg et al. -- | 330—146 X |
| 3,358,241 | 12/1967 | Hull ------------ | 330—146 X |

STANLEY M. DRYNOWICZ, Jr., Primary Examiner

U.S. Cl. X.R.

330—146